(12) United States Patent
Debouk et al.

(10) Patent No.: US 8,965,629 B2
(45) Date of Patent: Feb. 24, 2015

(54) SYSTEMS AND METHODS FOR CONFIRMING A POTENTIALLY UNINTENDED COMMAND GIVEN TO A VEHICLE

(75) Inventors: Rami I. Debouk, Dearborn, MI (US); Barbara J. Czerny, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 44 days.

(21) Appl. No.: 13/494,116

(22) Filed: Jun. 12, 2012

(65) Prior Publication Data

US 2013/0332033 A1 Dec. 12, 2013

(51) Int. Cl.
  *G06F 17/00* (2006.01)
(52) U.S. Cl.
  USPC .......... 701/36; 701/2; 701/9; 701/49
(58) Field of Classification Search
  CPC .......... B60G 2400/052; B60G 2400/823; B60G 2400/824; B60G 2400/60; G05D 3/00; B60J 1/2097; B60J 5/00; B60J 2005/00; B60J 7/1204; B60J 7/1269; G08B 21/00; G06K 9/00; G06K 9/00791
  USPC ........... 123/179.2; 307/10.1, 10.2, 10.4, 10.5; 340/5.72, 426.13, 426.35, 426.36, 438, 340/439; 701/2, 9, 49, 102, 115, 419, 451, 701/486; 702/188
  See application file for complete search history.

(56) References Cited

U.S. PATENT DOCUMENTS

| | | | |
|---|---|---|---|
| 6,785,595 B2 * | 8/2004 | Kominami et al. | 701/36 |
| 7,219,945 B1 | 5/2007 | Zinn et al. | |
| 7,737,860 B2 * | 6/2010 | Banta et al. | 340/691.6 |
| 7,840,317 B2 * | 11/2010 | Matos et al. | 701/16 |
| 7,880,594 B2 * | 2/2011 | Breed et al. | 340/425.5 |
| 8,032,285 B2 * | 10/2011 | Li | 701/49 |
| 8,115,620 B2 * | 2/2012 | Breed | 340/539.13 |
| 8,378,800 B2 * | 2/2013 | Mackjust et al. | 340/426.13 |
| 8,731,741 B2 * | 5/2014 | Oesterling | 701/2 |
| 2002/0154036 A1 * | 10/2002 | Flick | 340/988 |
| 2005/0068160 A1 * | 3/2005 | Pratt | 340/426.29 |
| 2005/0195068 A1 * | 9/2005 | Johnson et al. | 340/5.61 |
| 2006/0220806 A1 * | 10/2006 | Nguyen | 340/426.36 |
| 2007/0096445 A1 * | 5/2007 | Breed | 280/735 |
| 2007/0126561 A1 * | 6/2007 | Breed | 340/426.13 |
| 2008/0091309 A1 * | 4/2008 | Walker | 701/1 |
| 2008/0234878 A1 * | 9/2008 | Joao | 701/2 |
| 2009/0164053 A1 * | 6/2009 | Oesterling | 701/2 |
| 2011/0074561 A1 * | 3/2011 | Mackjust et al. | 340/426.13 |

* cited by examiner

*Primary Examiner* — Mary Cheung
*Assistant Examiner* — Atul Trivedi
(74) *Attorney, Agent, or Firm* — Ingrassia Fisher & Lorenz, P.C.

(57) ABSTRACT

A method and system are disclosed herein for confirming a potentially unintended command given to a vehicle. The method includes, but is not limited to, receiving a command from an operator configured to cause actuation of a vehicle system. The method further includes, but is not limited to, detecting a condition of the vehicle. The method further includes, but is not limited to, determining, with a processor, that the command is inconsistent with the condition. The method still further includes, but is not limited to alerting the operator that the command is inconsistent with the condition.

16 Claims, 5 Drawing Sheets

SYSTEMS AND METHODS FOR CONFIRMING A POTENTIALLY UNINTENDED COMMAND GIVEN TO A VEHICLE

TECHNICAL FIELD

The technical field generally relates to vehicles, and more particularly relates to systems and methods for confirming a potentially unintended command given to a vehicle by an operator.

BACKGROUND

Vehicle owners/operators send commands to their vehicles on a regular and recurring basis. Examples of sending commands to a vehicle include using a key fob to lock the doors of a vehicle or to open the rear hatch. Other examples include using a gear shift to change the state of the vehicle's transmission from park to drive or to reverse or to some other gear.

Sometimes however, the condition of a vehicle or a system of the vehicle is inconsistent or conflicting with the command that the vehicle owner/operator has given. For example, if the driver puts the transmission in drive or reverse while the vehicle's rear hatch is raised, it's likely that the driver has forgotten that the rear hatch is raised because drivers/vehicle operators typically prefer to have the rear hatch of a vehicle in a closed state when driving the vehicle. Similarly, if the driver locks the vehicle's doors while a door of the vehicle is in an open state, the driver has probably forgotten that the door is open because most vehicle owners/operators typically prefer to have all of the doors and hatches of a vehicle in a closed state when locking the vehicle.

At other times, a command given to the vehicle may have been given unintentionally. For example, a vehicle owner/operator or some other person may accidentally depress a button on a key fob (e.g., accidentally sitting on a key fob, a small child playing with a key fob, etc.). This action can lead to unintentionally raising a power operated door or rear hatch at times when raising/opening such closures is undesired.

Furthermore, there may be occasions when a driver deliberately actuates a power operated closure at a time when the closure's pathway is obstructed by an obstacle. An example of this would be a vehicle having a power operated rear hatch that is parked to close to a lamp post or a bystander. In another example, a minivan having a power operated side door may be parked too close to an adjacent vehicle.

Accordingly, it is desirable to provide a method by which a vehicle can confirm that a command received is actually intended despite an inconsistent condition or circumstance of the vehicle. In addition, it is desirable to equip a vehicle with a system which can confirm that a command received is actually intended despite an inconsistent condition or circumstance of the vehicle. Furthermore, other desirable features and characteristics of the present invention will become apparent from the subsequent detailed description and the appended claims, taken in conjunction with the accompanying drawings and the foregoing technical field and background.

SUMMARY

A system and method for confirming a potentially unintended command given to a vehicle are disclosed herein.

In a first non-limiting embodiment, the method includes, but is not limited to, receiving a command from an operator configured to cause actuation of a vehicle system. The method further includes, but is not limited to, detecting a condition of the vehicle. The method further includes, but is not limited to, determining, with a processor, that the command is inconsistent or conflicting with the condition. The method still further includes, but is not limited to alerting the operator that the command is inconsistent or conflicting with the condition.

In another non-limiting embodiment, the method includes, but is not limited to, receiving a command from an operator configured to cause actuation of a vehicle system. The method further includes, but is not limited to, detecting a condition of a rear hatch of the vehicle. The method further includes, but is not limited to, determining, with a processor, that the command is inconsistent or conflicting with the condition of the rear hatch. The method further includes, but is not limited to, alerting the operator that the command is inconsistent or conflicting with the condition of the rear hatch. The method still further includes, but is not limited to, actuating the vehicle system when a confirmation of the command is received from the operator.

In another non-limiting embodiment, the system includes, but is not limited to, a sensor that is associated with the vehicle and that is configured to detect a condition of the vehicle. The system further includes, but is not limited to, a communication device that is configured to alert an operator associated with the vehicle. The system still further includes, but is not limited to, a processor that is communicatively coupled with the sensor and that is communicatively coupled with the communication device. The sensor is further configured to communicate the condition to the processor. The processor is configured to receive a command from the operator, to determine when the command is inconsistent or conflicting with the condition, and to control the communication device to notify the operator that the command is inconsistent or conflicting with the condition.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
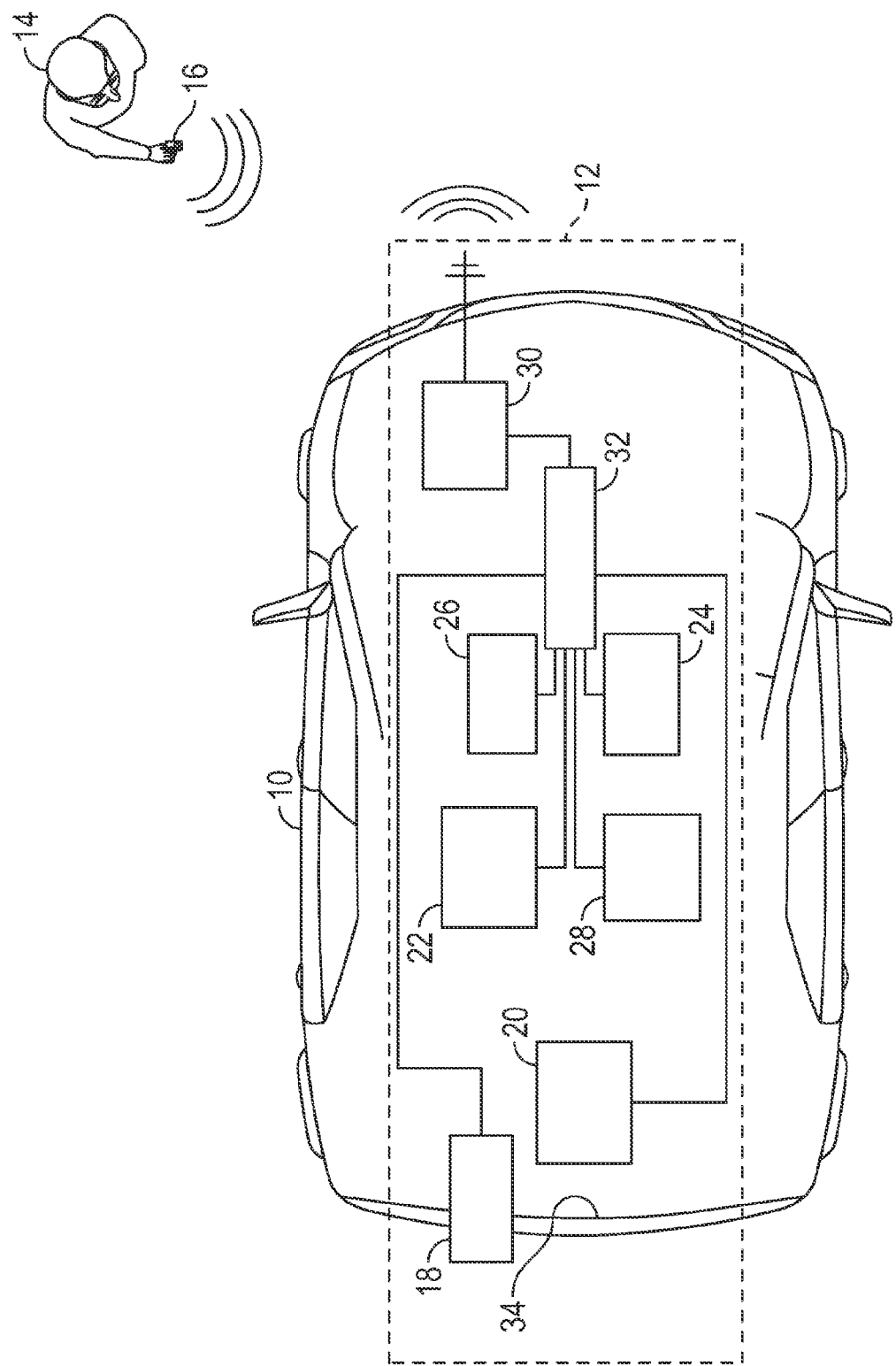
FIG. 1 is a schematic view of a system for confirming a potentially unintended command given to a vehicle, in accordance with an embodiment.

The following detailed description is merely exemplary in nature and is not intended to limit the application and uses. Furthermore, there is no intention to be bound by any expressed or implied theory presented in the preceding technical field, background, brief summary or the following detailed description.

A system and method are disclosed herein for confirming a potentially unintended command given to a vehicle by a vehicle owner/operator. In an embodiment, the system includes one or more sensors and a processor. The sensors are communicatively coupled to the processor. In some embodiments, the system also includes a communication device, such as a transceiver, that is communicatively coupled to the processor. In some embodiments, the system may further include a display unit or other device configured to communicate with a vehicle occupant.

The sensors are configured to monitor various conditions of various systems of the vehicle. For example, one sensor may be configured to monitor one or more vehicle closures and to detect when the vehicle closure is in an open or closed state. Another sensor may be configured to monitor the vehicle's transmission and to determine what gear the vehicle's transmission is in and when a gear change has been requested by the vehicle's operator. Another sensor may be configured to monitor the vehicle's ignition and to detect if the vehicle is in an on state or an off state. Another sensor may be configured to detect obstacles in the vicinity of the vehicle's closures.

The transceiver is configured to receive commands from the vehicle owner/operator. For example, the vehicle owner/operator may use a key fob or smart phone to issue commands to the vehicle. Those commands are received by the transceiver and delivered to the processor. In some embodiments, the transceiver may be further configured to transmit communications to the key fob and/or smart phone.

The processor is configured to obtain information relating to the condition(s) of the one or more systems of the vehicle from the one or more sensors monitoring the various systems, to receive the command issued by the vehicle owner/operator, and to determine whether the command is inconsistent with one or more of the conditions detected by the sensors. An example of a command that would be inconsistent with a condition of the vehicle is a command to change the transmission from park to drive when a rear hatch or other closure of the vehicle is in an open state. Another example is a command to open the vehicle's rear hatch when the vehicle is off or when there is an obstacle blocking the pathway of the rear hatch. Another example is a command to lock the vehicle's doors when one or more of the doors or other closures are in an open state. It should be understood that this is not an exhaustive list and that other examples are possible. As used herein, the term "potentially unintentional command" shall refer to a command that is inconsistent with a condition of the vehicle.

When a potentially unintentional command is received, the processor is configured to initiate communications with the vehicle owner/operator to alert the vehicle owner/operator about the condition that is inconsistent with the command. This communication may take any suitable form and may include, without limitation and in any combination, flashing lights of the vehicle, displaying a textual or graphic message on the screen of the display unit, emitting an audible alarm within the passenger compartment of the vehicle, transmitting an electronic message to the key fob associated with the vehicle, transmitting an electronic message to a smartphone associated with the vehicle's owner/operator, or any other suitable method that is effective to attract the attention of the operator who has issued the potentially unintentional command.

It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

The following description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Terms such as "comprise," "include," "have," "contain," and variations thereof are utilized in a non-exclusive sense such that a process, method, article, or apparatus described as comprising, including, having, containing, an element or step or a list of elements or steps is not necessarily limited to those elements, but may include other elements or steps not expressly listed or inherent to such process, method, article, or apparatus.

With respect to FIG. 1, a schematic view is presented of a vehicle 10 equipped with a system 12 for confirming a potentially unintended command given to vehicle 10 by an operator 14. In the illustrated example, operator 14 is positioned outside of vehicle 10 and is issuing the potentially unintended command with a key fob 16. It should be understood that in other examples, rather than using a key fob, operator 14 may be seated inside of vehicle 10 and may press a button, actuate a switch, or otherwise engage with any of a number of vehicle systems and that such action may result in the issuance of an unintended command to vehicle 10.

In the illustrated embodiment, system 12 includes an object sensor 18, a rear hatch sensor 20, a gear shift sensor 22, an ignition sensor 24, a display unit 26, a user input unit 28, and a wireless communication device 30, all communicatively coupled to a processor 32. In other embodiments, system 12 may include a greater or lesser number of components without deviating from the teachings of the present disclosure.

Object sensor 18 is configured to detect the presence of objects located proximate vehicle 10. In the illustrated embodiment, object sensor 18 is positioned proximate a rear hatch 34 of vehicle 10 and is configured to send a signal to processor 32 when an object or person is detected in a location that will obstruct the path taken by rear hatch 34 as rear hatch 34 moves from a closed position to an open position. In other embodiments, object sensor 18 may be positioned elsewhere on vehicle 10 and may be configured to send a signal to processor 32 when the path of other vehicle closures (e.g., a vehicle door) is obstructed by objects or persons. In still other embodiments, multiple object sensors 18 may be mounted to vehicle 10 at multiple locations around vehicle 10 to monitor the pathway of multiple vehicle closures for objects or persons. In some embodiments, object sensor 18 may be configured to continuously sense for the presence of obstacles while in other embodiments, object sensor 18 may be configured to sense for the presence of obstacles only when a command has been given to open rear hatch 34.

Rear hatch sensor 20 is configured to detect the state of rear hatch 34 (i.e., whether rear hatch 34 is in an open state or a closed state). Rear hatch sensor 20 is further configured to send a signal to processor 32 indicative of the state of rear hatch 34. In some embodiments, rear hatch sensor 20 may be configured to send the signal to processor 32 periodically. In other embodiments, rear hatch sensor 20 may be configured to send the signal to processor 32 each time that the state of rear hatch 34 changes. In other embodiments, rear hatch sensor 20 may be configured to send the signal to processor 32 in response to an interrogation by processor 32. In other embodiments, rear hatch sensor 20 may be configured to send the signal to processor 32 at any other suitable time. Although the illustrated embodiment depicts rear hatch sensor 20 as being associated with rear hatch 34, it should be understood that in other embodiments, sensors configured to detect the state of a closure may be used to monitor any or all vehicle closures without departing from the teachings of the present disclosure.

Gear shift sensor 22 is configured to detect the position of the gear shift used by a vehicle operator to control the state of the vehicle's transmission. For example, gear shift sensor 22 is configured to detect when the gear shift is in park and is further configured to detect when operator 14 moves the gear shift out of park (e.g., into drive or reverse). Gear shift sensor 22 is further configured to transmit a signal to processor 32 that is indicative of the position of the gear shift and that is further indicative of changes made by a vehicle operator to the position of the gear shift.

Ignition sensor 24 is configured to detect the position of the vehicle's ignition and to thereby detect the state of the vehicle (i.e., whether the vehicle is in an on state or an off state). Ignition sensor 24 is further configured to transmit a signal to processor 32 that is indicative of the state of the vehicle. In other embodiments, other sensors that are configured to determine the state of the vehicle may also be used without departing from the teachings of the present disclosure.

Display unit 26 may be any type of display device that generates visual output using any one of a number of different technologies. For example, display unit 26 may be a Cathode Ray Tube (CRT) display device, a flat panel display device, a Liquid Crystal Display (LCD) device, a plasma display device, an electro-luminescent display device, a Light Emitting Diode (LED) display device, a holographic display device such as a Head Up Display (HUD), a Micro Mirror Device (MMD) display device, or the like. In some embodiments, display unit 26 may comprise a light or a plurality of lights. Additionally, the schematically represented display unit 26 may include multiple individual display screens communicatively connected or otherwise configured to cooperate with one another. In some embodiments, display unit 26 may include one or more speakers that are configured to emit audible sounds. In still other embodiments, system 12 may omit a display unit 26 and may, instead, include only a speaker or other device that is configured to emit audible sounds.

User input unit 28 may be any component suitable to receive inputs from the operator of vehicle 10. For example, and without limitation, user input unit 28 may be a touch screen, a button, a switch, a knob, a slide, a microphone, a camera, a motion detector, or any other device that is configured to permit a human to provide inputs into an electronic system. User input unit 28 is further configured to send a signal to processor 32 that is indicative of the input received by user input unit 28. In some embodiments, user input unit 28 may be may be dedicated for use exclusively with system 12 while in other embodiments user input unit 28 may be shared with other systems on board vehicle 10.

Communication device 30 may be any type of communication device that is configured to receive wireless communications. Communication device 30 may be configured to receive satellite communication transmissions, microwave transmissions or any other type of RF transmissions. Communication device 30 may include associated electronics that are needed to process the wireless signals that are received by communication device 30. In the illustrated example, communication device 30 is configured to receive transmissions from key fob 16. In other examples, communication device 30 may be configured to receive communications from a smart phone or other portable device. Communication device 30 is further configured to send the signal to processor 32 that is indicative of the wireless communication received by communication device 30 from key fob 16 or from any other source.

Processor 32 may be any type of onboard computer, computer system, or microprocessor that is configured to perform algorithms, to execute software applications, to execute subroutines and/or to be loaded with and to execute any other type of computer program. Processor 32 may comprise a single processor or a plurality of processors acting in concert. In some embodiments, processor 32 may be dedicated for use exclusively with system 12 while in other embodiments processor 32 may be shared with other systems on board vehicle 10.

As set forth above, processor 32 is communicatively coupled with each of the other components of system 12. Such coupling may be achieved through the use of any suitable means of transmission including both wired and wireless connections. For example, each component may be physically connected to processor 32 via a coaxial cable or via any other type of wire connection effective to convey signals. In the illustrated embodiment, processor 32 is directly communicatively connected to each of the other components. In other embodiments, each component may be communicatively coupled to processor 32 across a vehicle bus. In still other examples, each component may be wirelessly connected to processor 32 via a Bluetooth connection, a WiFi connection or the like.

Being communicatively coupled provides a pathway for the transmission of commands, instructions, interrogations and other signals between processor 32 and each of the other components. Through this communicative coupling, processor 32 may control and/or communicate with each of the other components. As discussed above, each of the other components of system 12 is configured to interface and engage with processor 32, such as through the sending of signals to processor 32.

Processor 32 is configured to interact with, coordinate and/or orchestrate the activities of each of the other components of system 12 for the purpose of confirming a potentially unintended command given to the vehicle 10 by operator 14. Processor 32 may be programmed and/or otherwise configured to receive the signals from the various sensors of system 12, to receive a command from operator 14 through communication device 30 or through gearshift sensor 22 or through any other medium, and to determine whether the command is a potentially unintended command. To make this determination, processor 32 may be programmed to identify predetermined scenarios as being inconsistent. For example, if operator 14 transmits a command through key fob 16 to lock all the closures of vehicle 10 at a time when processor 32 has received a signal from rear hatch sensor 20 indicating that rear hatch 34 is in an open state, processor 32 is configured to determine that this command is potentially unintended. In another example, if operator 14 transmits a command through key fob 16 to open rear hatch 34 at a time when processor 32 has received a signal from object sensor 18 that an object blocks the path of rear hatch 34, processor 32 is configured to determine that this command is potentially unintended. In another example, if operator 14 moves the gearshift of vehicle 10 from park to drive at a time when processor 32 has received a signal from rear hatch sensor 20 that rear hatch 34 is in an open state, processor 32 is configured to determine that this command is potentially unintended. In yet another example, if processor 32 receives a command from key fob 16 to open rear hatch 34 at a time when processor 32 has received a signal from ignition sensor 24 that vehicle 10 is in an off state, processor 32 is configured to determine that this command is potentially unintended. With respect to this last example, in some embodiments, processor 32 may be configured to determine that the command is potentially unintended only when vehicle 10 has been in an off state for greater than a predetermined period of time (e.g., greater than three minutes).

Once processor 32 has determined that a command from operator 14 is a potentially unintended command, processor 32 is configured to take action intended to alert operator 14 of the inconsistency between the command and the condition of vehicle 10. In some embodiments, the type of alert transmitted will correspond to the type of inconsistency detected. For example, when operator 14 moves the gearshift from park to drive while rear hatch 34 is open, processor 32 may be configured to send a signal to display unit 26 that causes display unit 26 to display a warning and to emit an audible alert intended to attract the attention of operator 14 to the inconsistency. In this example, chimes may sound while a textual message is flashed across display unit 26. However, in the circumstance where operator 14 is standing outside of vehicle 10 and uses key fob 16 to transmit a locking command to lock all the closures of vehicle 10 while rear hatch 34 is in an open state, processor 32 may be configured to send a signal to communication device 30 that causes communication device 30 to transmit a wireless signal to key fob 16 (or to a portable device held by operator 14) intended to alert operator 14 of the inconsistency between the command and the condition of vehicle 10. For example, key fob 16 may vibrate or emit an audible alarm in response to receiving the wireless signal from communication device 30.

Once operator 14 has been alerted to the inconsistency between the command and the state of the vehicle, operator 14 may confirm the command, cancel the command, or correct the inconsistent condition. For example, in the circumstance where operator 14 has moved the gearshift from park to drive, operator 14 may utilize user input unit 28 to send a signal to processor 32 confirming the command. Alternatively, operator 14 may move the gearshift from drive back to park. In a third alternative, operator 14 may close rear hatch 34. In the example where operator 14 has transmitted a locking command while rear hatch 34 is in an open state, operator 14 may utilize key fob 16 to confirm the command, to cancel the command, or too remotely close rear hatch 34. In some embodiments, an operator may not wish to have his or her commands questioned by the vehicle. In such embodiments, a switch may be included that permits the driver to disable system 12.

With respect to FIGS. 2-5, various embodiments of a method 36 for confirming a potentially unintended command given to a vehicle are illustrated. It should be understood that the scenarios depicted in the various illustrative examples are not exhaustive and that the methods set forth below in the claims may be utilized to confirm any type of potentially unintentional command. With continuing reference to FIG. 1, method 36 may be performed utilizing system 12 to carry out the various method steps. Alternatively, method 36 may be performed utilizing any other system or collection of devices associated with a vehicle, such as vehicle 10, that are effective to carry out the various steps of method 36.

Figure 2:
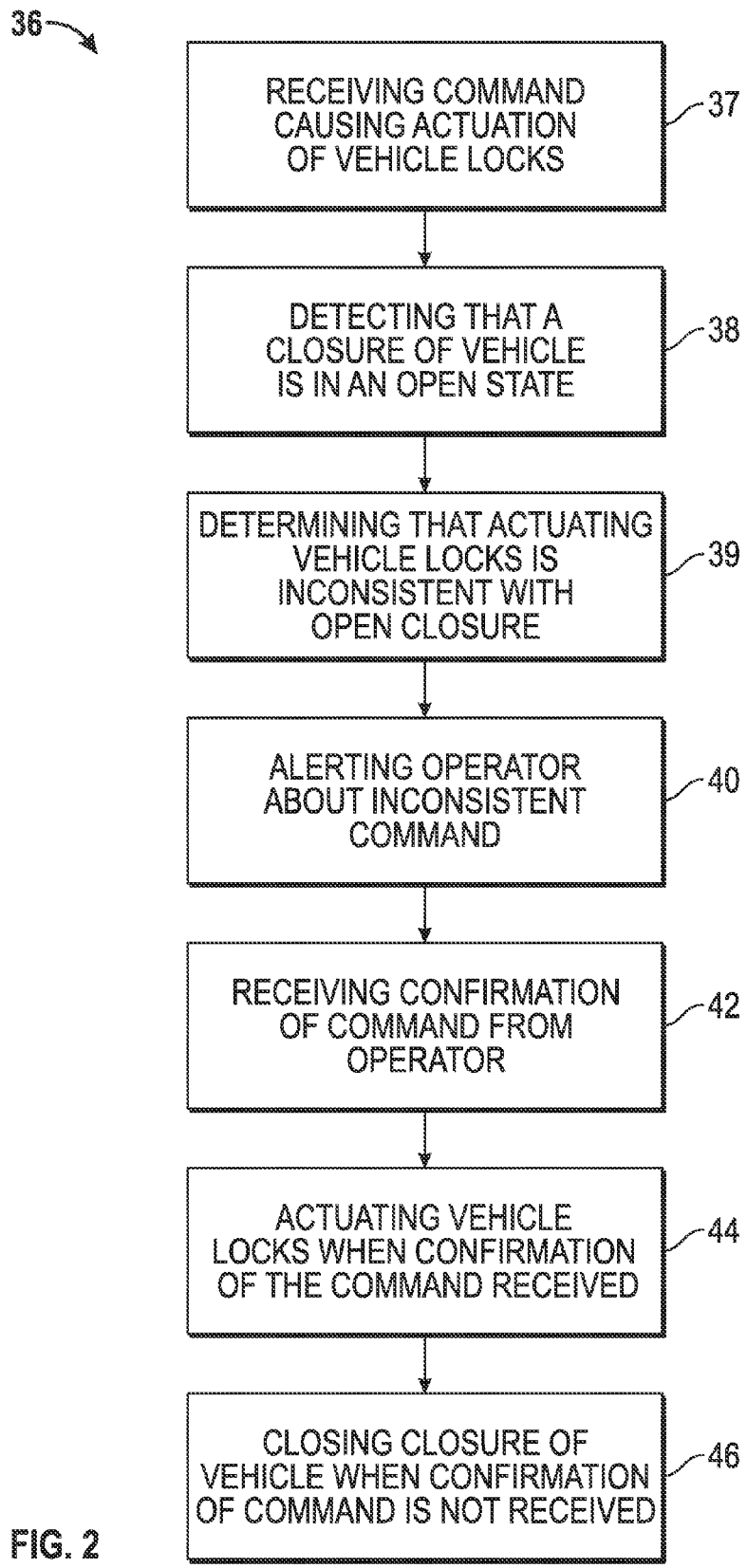
FIG. 2 is a flow diagram illustrating a method for confirming a potentially unintended command given to a vehicle, in accordance with an embodiment.

With respect to FIG. 2, an embodiment of method 36 is illustrated for confirming a potentially unintended command given to a vehicle. At step 37, a command is received at the vehicle that actuates the locks on a vehicle's closures while the ignition of the vehicle is in an off state, causing them to lock. This command may be forwarded to a processor or other device on board the vehicle for execution. At step 38, a sensor on board the vehicle detects that a closure of the vehicle is in an open state. The sensor may communicate the open state of the closure to the processor or other device. At step 39, the processor or other device determines that a command to actuate the locks on the vehicle's closures is inconsistent with a closure of the vehicle being in an open state. At step 40, the processor or other device takes action to alert the operator about the inconsistency between the command and the condition of the vehicle. For example, the processor or other device may actuate one or more systems or devices on board the vehicle to display a visible alarm or to emit audible alarm. In other examples, the processor or other device may actuate a wireless communication device that is configured to transmit a wireless signal to a portable device associated with the operator (e.g., a key fob, a smart phone, etc.) that will trigger the portable device to alert the operator about the inconsistency.

If the operator decides to proceed with the command despite the inconsistency, the operator will communicate confirmation of the command to the vehicle. Such confirmation may be communicated to the vehicle in the same manner as the initial command or in any other suitable manner. At step 42, the processor or other device receives the operator's confirmation. At step 44, the processor or other device sends a signal to the vehicle's locking mechanism to actuate the locks, thereby locking the closures.

If the operator does not wish to lock the vehicle's closures while the vehicle's rear hatch is in an open state, the operator may communicate this decision to the vehicle in the same manner that the operator communicated the initial command. In other embodiments, the operator may communicate this decision by simply refraining from sending a confirmation of the command. At step 46, when the processor or other device fails to receive confirmation of the command, the processor or other device is configured to send a signal to the open closure that causes the open closure to move to a closed state, after which, the processor may then actuate the vehicle's locks. In such embodiments, the processor or other device may be configured to first determine whether it is appropriate to move the closure to a closed state. For example, the processor or other device may be configured to take into account one or more inputs from one or more sensors or other devices that are associated with the vehicle and that are indicative of whether the closure is obstructed from moving to the closed position. When it is determined that the closure pathway is not obstructed, then the processor may send the signal to the open closure that causes the open closure to move to a closed state. In other embodiments, the processor or other device may be configured to refrain from sending a locking signal to the closures.

Figure 3:
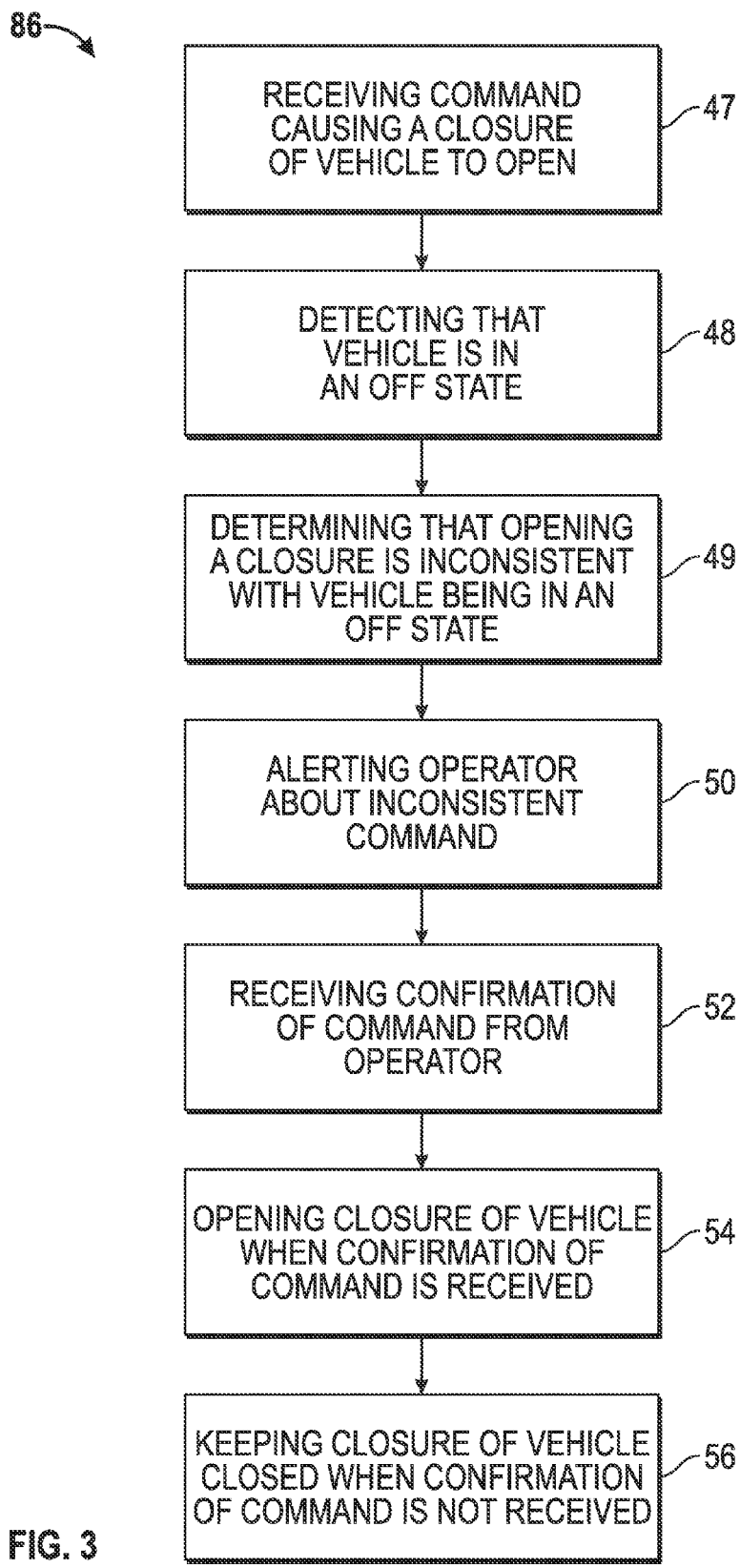
FIG. 3 is a flow diagram illustrating a method for confirming a potentially unintended command given to a vehicle, in accordance with another embodiment.

With respect to FIG. 3, another embodiment of a method 86 is illustrated for confirming a potentially unintended command given to a vehicle. At step 47, a command is received at the vehicle that causes a vehicle closure to open. This command may be forwarded to a processor or other device on board the vehicle for execution. At step 48, a sensor on board the vehicle detects that the vehicle is in an off state. The sensor may communicate the off state of the vehicle to the processor or other device. At step 49, a processor or other component determines that opening a closure of the vehicle is inconsistent with the vehicle being in an off state. At step 50, the processor or other device takes action to alert the operator about the inconsistency between the command and the condition of the vehicle. For example, the processor or other device may actuate a wireless communication device that is configured to transmit a wireless signal to a portable device associated with the operator (e.g., a key fob, a smart phone, etc.) that will trigger the portable device to alert the operator about the inconsistency.

If the operator decides to proceed with the command despite the inconsistency, the operator will communicate confirmation of the command to the vehicle. Such confirmation may be communicated to the vehicle in the same manner as the initial command or in any other suitable manner. At step 52, the processor or other device receives the operator's confirmation. At step 54, the processor or other device sends a signal to the vehicle's opening mechanism associated with the closure that actuates the opening mechanism, thereby causing the closure to open.

If the operator does not wish to open the vehicle's closures because, for example, the command was accidentally transmitted to the vehicle, the operator may communicate this decision to the vehicle in the same manner that the operator communicated the initial command. In other instances, the operator may communicate this decision by simply refraining from sending a confirmation of the command. At step 56, when the processor or other device fails to receive confirmation of the command, the processor or other device is configured to refrain from sending an actuating command to the opening mechanism associated with the closure.

Figure 4:
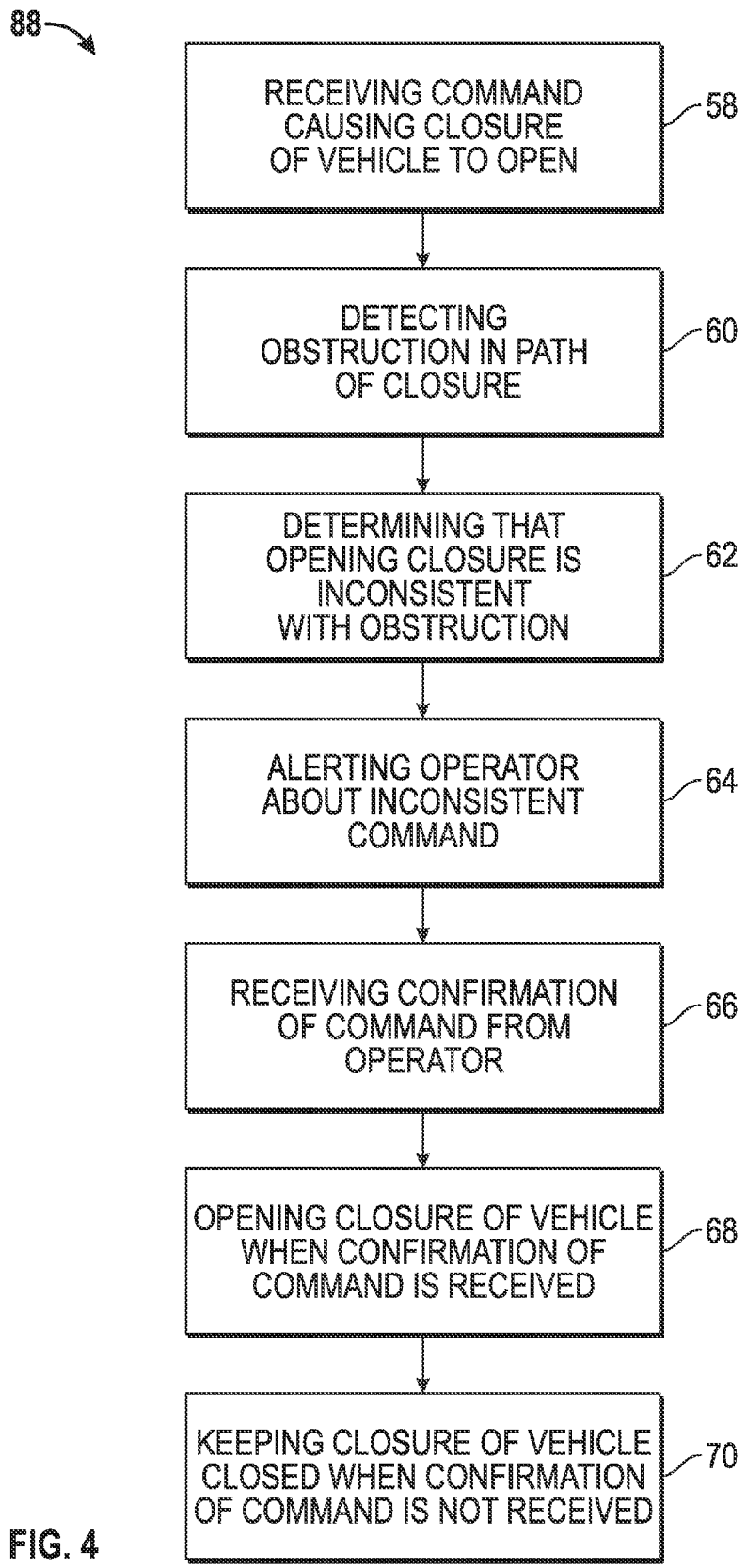
FIG. 4 is a flow diagram illustrating a method for confirming a potentially unintended command given to a vehicle, in accordance with another embodiment.

With respect to FIG. 4, another embodiment of a method 88 is illustrated for confirming a potentially unintended command given to a vehicle. At step 58, a command is received at the vehicle that causes a vehicle closure to open. This command may be forwarded to a processor or other device on board the vehicle for execution. At step 60, a sensor on board the vehicle detects that the path to be taken by the closure as it moves from a closed state to an open state is obstructed. The sensor may communicate the presence of the obstruction to the processor or other device. At step 62, a processor or other component determines that opening a closure is inconsistent with the presence of an obstruction in the pathway of the closure. At step 64, the processor or other device takes action to alert the operator about the inconsistency between the command and the condition of the vehicle. For example, the processor or other device may actuate a wireless communication device that is configured to transmit a wireless signal to a portable device associated with the operator (e.g., a key fob, a smart phone, etc.) that will trigger the portable device to alert the operator about the inconsistency. In other examples, the processor or other device will send a signal to a display unit or to a speaker configured to emit audible sounds or both mounted inside the vehicle's passenger cabin that will cause the display unit and/or the speaker to display/emit an alarm intended to alert the operator about the inconsistency.

If the operator decides to proceed with the command despite the inconsistency, the operator will communicate confirmation of the command to the vehicle. Such confirmation may be communicated to the vehicle in the same manner as the initial command or in any other suitable manner. At step 66, the processor or other device receives the operator's confirmation. At step 68, the processor or other device sends a signal to the vehicle's opening mechanism associated with the closure that actuates the opening mechanism, thereby causing the closure to open. In some embodiments, the processor or other device may be further configured to send a signal that will actuate an alarm, a sound emitting device, or to any other device associated with the vehicle that is configured to emit an audible alert for the purpose of warning anyone in the pathway of the closure that the closure is about to open.

If the operator does not wish to open the vehicle's closures after receiving the warning of the obstruction, the operator may communicate this decision to the vehicle in the same manner that the operator communicated the initial command. In other instances, the operator may communicate this decision by simply refraining from sending a confirmation of the command. At step 70, when the processor or other device fails to receive confirmation of the command, the processor or other device is configured to refrain from sending an actuating command to the opening mechanism associated with the closure.

Figure 5:
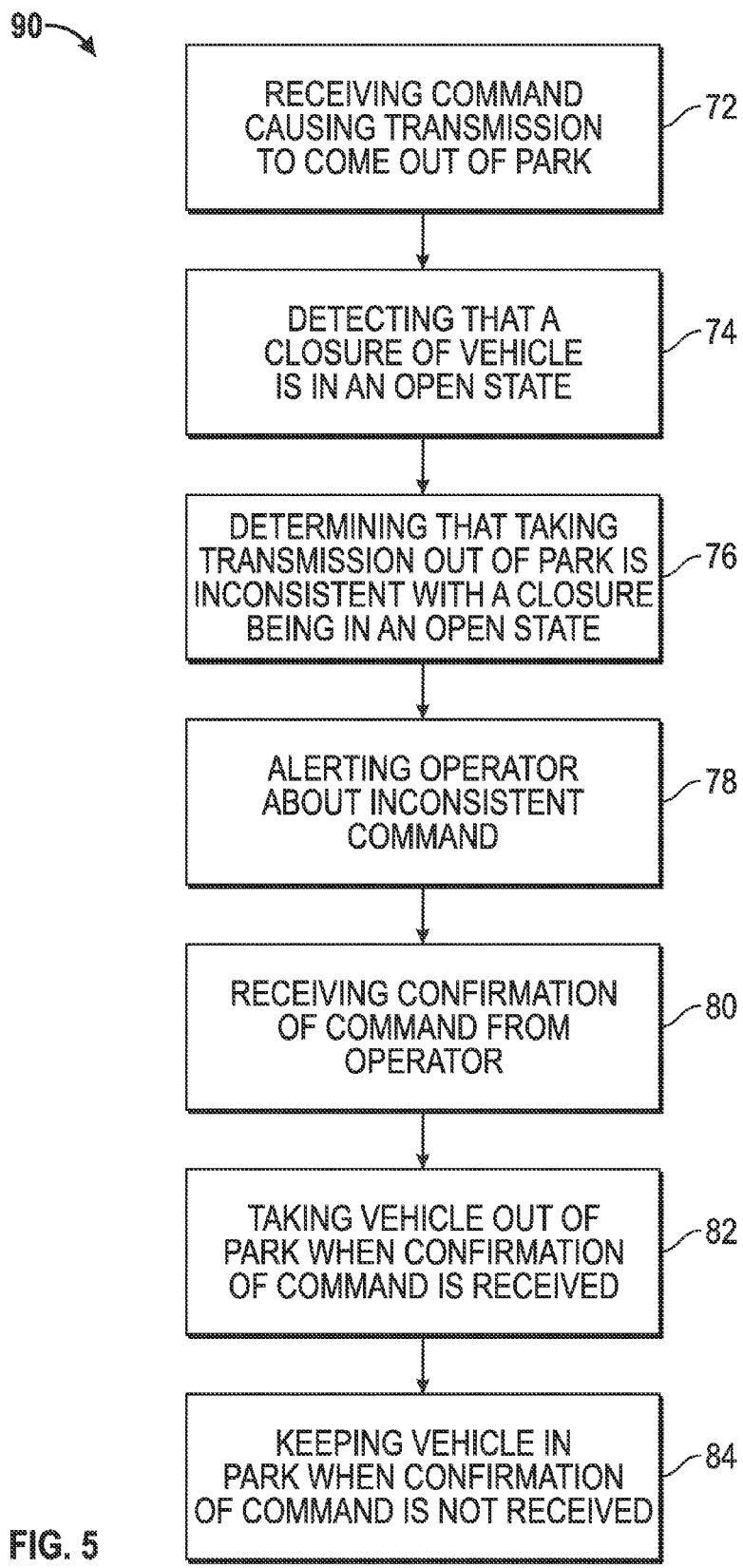
FIG. 5 is a flow diagram illustrating a method for confirming a potentially unintended command given to a vehicle, in accordance with yet another embodiment.

With respect to FIG. 5, yet another embodiment of a method 90 for confirming a potentially unintended command given to a vehicle is illustrated. At step 72, a command is received at the vehicle that causes the vehicle's transmission to come out of park while the vehicle's ignition is an on state. This command may be forwarded to a processor or other device on board the vehicle for execution. At step 74, a sensor on board the vehicle detects that a closure of the vehicle is in an open state. The sensor may communicate the open state of the closure to the processor or other device. At step 76, a processor or other component determines that taking the transmission out of park is inconsistent with a condition where one of the vehicle's closures is in an open state. At step 78, the processor or other device takes action to alert the operator about the inconsistency between the command and the condition of the vehicle. For example, the processor other device may send a signal to a display unit or to a speaker in the vehicle's passenger compartment that will cause the display unit and/or the speaker to display/emit an alarm intended to alert the operator about the inconsistency.

If the operator decides to proceed with the command despite the inconsistency, the operator will communicate confirmation of the command to the vehicle. Such confirmation may be communicated to the vehicle using a suitable user input unit (e.g., a button, switch, knob, etc.). At step 80, the processor or other device receives the operator's confirmation. At step 82, the processor or other device sends a signal to the vehicle's transmission causing the transmission to come out of park. In embodiments where the vehicle is equipped with a backup camera, the processor or other device may be configured to send a signal that is configured to disable the backup camera, the monitor for the backup camera, or both while the vehicle's rear hatch is open and the vehicle's transmission is in reverse.

If the operator does not wish to take the transmission out of park after receiving the warning of the open closure, the operator may communicate this decision to the vehicle using the user input unit. In other instances, the operator may communicate this decision by simply refraining from sending a confirmation of the command. At step 84, when the processor or other device fails to receive confirmation of the command, the processor or other device is configured to send a signal to the vehicle's transmission that will keep the transmission in park. In other embodiments, the processor other device may be configured to send a signal to the open closure causing the closure to close.

Although the embodiments of methods 36, 86, 88, and 90 described above have been discussed in the alternative, it will be appreciated by those of skill in the art that a system may be configured to perform two or more of the embodiments of these methods. In some embodiments, a system may be capable of performing all of the embodiments of the methods described above as well as additional embodiments not expressly described herein. By configuring a system to perform multiple embodiments of methods 36, 86, 88, and 90, a greater range of responses can be given by a vehicle to a wide variety of potentially unintended commands.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for confirming a potentially unintended command given to a vehicle, the method comprising:
    receiving a command from an operator configured to cause actuation of a vehicle system;
    detecting a condition of the vehicle;
    determining, with a processor, that the command is conflicting with the condition;
    alerting the operator that the command is conflicting with the condition;
    receiving a confirmation of the command from the operator after the alerting step has occurred; and
    actuating the vehicle system in response to receiving the confirmation of the command,
    wherein the command comprises one of (a) a locking signal configured to cause actuation of a locking mechanism of the vehicle, (b) an opening signal configured to cause a closure of the vehicle to open, and (c) a transmission signal configured to cause a transmission of the vehicle to shift out of a parked state and wherein the condition respectively comprises one of (a) a closure of the vehicle being disposed in an open state, (b) an obstruction disposed in a path followed by the closure as the closure moves to an open state, and (c) the closure of the vehicle being disposed in the open state.

2. The method of claim 1, further comprising inhibiting actuation of the vehicle system when confirmation of the command is not received.

3. The method of claim 1, wherein the method further comprises closing the closure of the vehicle when no confirmation of the command is received from the operator.

4. The method of claim 1, wherein receiving the command from the operator comprises receiving an opening signal configured to cause a closure of the vehicle to open and wherein detecting the condition of the vehicle comprises detecting that the vehicle is in an off state.

5. The method of claim 4, wherein detecting that the vehicle is in the off state comprises detecting that the vehicle has been in the off state for greater than a predetermined period of time.

6. The method of claim 1, wherein the closure comprises a rear hatch.

7. The method of claim 1, wherein alerting the operator comprises emitting an audible signal at the vehicle.

8. The method of claim 1, wherein alerting the operator comprises displaying a visual signal at the vehicle.

9. The method of claim 1, wherein alerting the operator comprises transmitting a wireless signal to a portable device associated with the operator.

10. The method of claim 9, wherein alerting the operator comprises transmitting the wireless signal to a key fob.

11. The method of claim 9, wherein alerting the operator comprises transmitting the wireless signal to a smart phone.

12. A method for confirming a potentially unintended command given to a vehicle, the method comprising:
    receiving a command from an operator configured to cause actuation of a vehicle system;
    detecting a condition of a rear hatch of the vehicle
    determining, with a processor, that the command is conflicting with the condition of the rear hatch;
    alerting the operator that the command is conflicting with the condition of the rear hatch;
    receiving a confirmation of the command from the operator after the alerting step has occurred; and
    actuating the vehicle system in response to receiving a confirmation of the command from the operator,
    wherein the command comprises one of (a) a locking signal configured to cause actuation of a locking mechanism of the vehicle, and (b) an opening signal configured to cause a closure of the vehicle to open, and wherein the condition respectively comprises one of (a) a closure of the vehicle being disposed in an open state, and (b) an obstruction disposed in a path followed by the closure as the closure moves to an open state.

13. A system for confirming a potentially unintended command given to a vehicle, the system comprising:
    a sensor associated with the vehicle and configured to detect a condition of the vehicle;
    a communication device configured to alert an operator associated with the vehicle; and
    a processor communicatively coupled with the sensor and communicatively coupled with the communication device,
    wherein the sensor is further configured to communicate the condition to the processor, the processor is configured to receive a command from the operator configured to cause actuation of a vehicle system, to determine when the command is conflicting with the condition, to control the communication device to notify the operator that the command is conflicting with the condition, and to actuate the vehicle system in response to receiving a confirmation of the command from the operator after the communication device has notified the operator that the command is conflicting with the condition,
    wherein the command comprises one of (a) a locking signal configured to cause actuation of a locking mechanism of the vehicle, (b) an opening signal configured to cause a closure of the vehicle to open, and (c) a transmission signal configured to cause a transmission of the vehicle to shift out of a parked state and wherein the condition respectively comprises one of (a) a closure of the vehicle being disposed in an open state, (b) an obstruction disposed in a path followed by the closure as the closure moves to an open state, and (c) the closure of the vehicle being disposed in the open state.

14. The system of claim 13, wherein the communication device comprises a display unit.

15. The system of claim 13, wherein the communication device comprises a wireless transmitter.

16. The system of claim 13, wherein the communication device comprises a wireless transceiver.

* * * * *